(12) United States Patent
Bittel et al.

(10) Patent No.: US 9,284,860 B2
(45) Date of Patent: Mar. 15, 2016

(54) VALVE HOUSING FOR A CONTROL VALVE OF A CAMSHAFT ADJUSTING SYSTEM, AND METHOD FOR PRODUCING A VALVE HOUSING

(75) Inventors: Phillipp Bittel, Bamberg (DE); Stefan Foerst, Hirschaid (DE); Markus Weiss, Bamberg (DE); Josef Groeschel, Groessweinstein (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 301 days.

(21) Appl. No.: 13/883,942

(22) PCT Filed: Aug. 23, 2011

(86) PCT No.: PCT/EP2011/064480
§ 371 (c)(1),
(2), (4) Date: May 23, 2013

(87) PCT Pub. No.: WO2012/062493
PCT Pub. Date: May 18, 2012

(65) Prior Publication Data
US 2013/0284129 A1 Oct. 31, 2013

(30) Foreign Application Priority Data
Nov. 9, 2010 (DE) .......................... 10 2010 050 812

(51) Int. Cl.
*F01L 1/34* (2006.01)
*F01L 1/344* (2006.01)
*F15B 13/044* (2006.01)
*F16K 27/04* (2006.01)

(52) U.S. Cl.
CPC ................. *F01L 1/34* (2013.01); *F01L 1/3442* (2013.01); *F15B 13/044* (2013.01); *F16K 27/041* (2013.01); *F01L 2001/34426* (2013.01); *Y10T 29/49293* (2015.01)

(58) Field of Classification Search
CPC . F01L 1/3442; F01L 1/34; F01L 2001/34426; F16K 27/041; F15B 13/044
USPC ...................................... 137/315.27
See application file for complete search history.

(56) References Cited

U.S. PATENT DOCUMENTS

| 6,289,921 | B1 | 9/2001 | Neuhaus et al. |
| 6,367,434 | B1 | 4/2002 | Steigerwald et al. |
| 7,069,951 | B2 * | 7/2006 | Cornea ..................... 137/625.68 |
| 8,893,676 | B2 * | 11/2014 | Hoppe et al. ............... 123/90.17 |
| 2004/0007193 | A1 | 1/2004 | Dietz |
| 2012/0111296 | A1 | 5/2012 | Hoppe et al. |

FOREIGN PATENT DOCUMENTS

| CN | 102472127 A | 5/2012 |
| DE | 197 27 180 | 1/1999 |

(Continued)

*Primary Examiner* — Kevin Lee
(74) *Attorney, Agent, or Firm* — Davidson, Davidson & Kappel, LLC

(57) ABSTRACT

A valve housing for a control valve of a camshaft adjuster, including a housing flange for fastening to a control unit as well as an essentially cylindrical housing component for accommodating a control piston. It is provided that the housing component is rotatably fixedly attached to the housing flange by a form-locked connection. A valve housing of this type is cost effective to manufacture and has a low weight, while ensuring operational reliability. The invention furthermore relates to a method for manufacturing an aforementioned valve housing.

7 Claims, 4 Drawing Sheets

(56) References Cited

FOREIGN PATENT DOCUMENTS

| DE | 199 56 160 | 5/2001 |
| DE | 102 23 431 | 12/2003 |
| DE | 10 2004 006335 | 8/2005 |
| DE | 10 2004 038160 | 12/2005 |
| DE | 10 2006 055735 | 5/2008 |
| DE | 10 2007 042046 | 3/2009 |
| DE | 10 2009 018044 | 10/2010 |
| WO | WO 2010/118930 | 10/2010 |
| WO | WO 2011/003682 | 1/2011 |

* cited by examiner

VALVE HOUSING FOR A CONTROL VALVE OF A CAMSHAFT ADJUSTING SYSTEM, AND METHOD FOR PRODUCING A VALVE HOUSING

The present invention relates to a valve housing for a control valve of a camshaft adjusting system, including a housing flange for fastening to a control unit as well as an essentially cylindrical housing component for accommodating a control piston.

The present invention furthermore relates to a method for manufacturing an aforementioned valve housing.

BACKGROUND

As part of a camshaft adjusting system, a camshaft adjuster is used to adjust the phase angle between a camshaft and a crankshaft in an internal combustion engine in a targeted manner and thus allows for the optimized setting of the valve control times. This makes it possible, for example, to increase the power of an internal combustion engine or reduce consumption.

A camshaft adjuster usually includes a stator, which is rotatably fixedly connected to the crankshaft, and a rotor held in this stator. The rotor, in turn, is rotatably fixedly connected to the camshaft and may be adjusted in relation to the stator. The adjustment of the rotor is induced by applying a hydraulic fluid to pressure chambers provided in the stator.

Control valves are used to ensure this pressure application. Control valves of this type usually include a valve housing and an electromagnetically activated control piston positioned in the valve housing. Activating this piston allows the supply and discharge of the hydraulic fluid to be adjusted and the valve control times to be influenced. Optimum valve control times in this case directly affect the driving performance as well as fuel consumption and the emissions associated therewith.

Common control valves are frequently manufactured with valve housings which are very heavy, due to their design as massive turned parts. With regard to the steadily increasing requirements of the automotive industry to reduce the weight of the components used and to minimize the cost of their manufacture, massive valve housings are thus not a permanent solution for a valve housing of a control valve.

SUMMARY OF THE INVENTION

It is an object of the present invention to provide a valve housing for a control valve which is cost-effective to manufacture, while ensuring its functionality and minimizing its weight.

Another object of the present invention is to provide a method for manufacturing an aforementioned valve housing.

The present invention provides a valve housing for a control valve of a camshaft adjusting system, including a housing flange for fastening to a control unit as well as an essentially cylindrical housing component for accommodating a control piston. It is provided that the housing component is rotatably fixedly attached to the housing flange by a form-locked connection.

The present invention takes into account the fact that the steadily increasing requirements with regard to weight and costs in the manufacture of a control valve may not be met by the use of massively produced valve housings. However, the manufacture of separate, individual parts which are connected to each other is one way to reduce the weight. As a result, lighter-weight and more cost-effective materials may be selected where less strict requirements are to be met.

However, difficulties occasionally arise in a mechanical connection of the individual parts, in particular with regard to an undesirable twisting of the components in relation to each other. Movements of this type may have a negative influence on the activation of the camshaft adjuster in the installed state, so that the operational reliability thereof may not be ensured.

Other options for connecting components, for example injection molding the created assembly, also do not provide reasonable alternatives, against the background of the increased logistics complexity and investment and manufacturing costs.

The present invention achieves a rotatably fixed attachment between the housing component and the housing flange with the aid of a form-lock between the two components. Due to the form-lock, a relative movement between the housing component and the housing flange may be prevented, so that the two components are rotatably fixedly attached to each other. In addition, the form-locked connection may transmit particularly high forces and offers the desired security against an undesirable detachment of the components from each other.

Thanks to the form-locked connection and the ability to prevent twisting associated therewith, it is possible to dispense with a one-piece and massive production of the valve housing or complex manufacturing steps for connecting the housing component to the housing flange.

As part of a control valve, the valve housing is used to position a control piston. The desired adjustment of the camshaft adjuster may be achieved by controlling the control piston within the valve housing and thus by metering the hydraulic medium. For this purpose, the control piston is usually electromagnetically activated, it being possible to implement the activation via a control unit fastened to the housing flange. This control unit usually includes a magnet which moves the control piston when it is supplied with electric current. In this way, the pressure is switched between the hydraulic chambers of the camshaft adjuster. The hydraulic chamber to which no pressure is applied is connected to a return line, so that hydraulic fluid may flow back into the circuit.

The control piston is usually axially movably mounted in the housing component of the valve housing. The housing component is preferably manufactured in a single piece made of plastic with the aid of an injection molding process. The use of a plastic allows a low weight of the valve housing to be ensured. Furthermore, the choice of the plastic makes it possible to influence the hardness and corrosion resistance of the housing component.

The housing component may be designed, for example, in the form of a lattice, it being possible to introduce a filter element into the lattice. A filter element is used to filter dirt particles out of the hydraulic medium which is needed to adjust the camshaft. This makes it possible to prevent particles from entering the hydraulic chambers of the camshaft adjuster.

In addition, a sleeve may be situated within the valve housing or within the housing component, which is used to guide the control piston and which is advantageously also provided with a lattice structure. In the installed state, the lattice openings in the sleeve may have different widths in relation to the lattice openings of the housing component. In all embodiments, it is ensured, in particular, that the lattice openings available for metering hydraulic fluid are dimensioned to be sufficiently large. Alternatively or additionally, a filter element may also be positioned in the openings in the sleeve. The sleeve is preferably made of a steel.

The housing flange is preferably made of a metallic material. The metallic material may be manufactured according to the environmental conditions and the forces acting upon it. A steel is preferably used. This makes it possible to ensure the necessary stability of the valve housing.

Overall, the weight of the valve housing may be reduced by selecting different materials for the housing component and the housing flange. In addition, the particular area of the resulting component may be specifically adapted to the intended use. A valve housing of this type may therefore be manufactured cost-effectively and in a customer-specific manner.

In one advantageous embodiment of the present invention, the housing component may be additionally axially fixed to the housing flange by the form-locked connection. This makes it possible to prevent the components from twisting in relation to each other and, at the same time, to ensure an axial fixing of the components to each other by establishing a form-locked connection.

In another advantageous embodiment of the present invention, the housing flange includes a collar, into which the housing component is inserted together with a shoulder. The collar may be provided in uninterrupted form or it may preferably entirely enclose the housing flange. The shoulder of the housing component is designed as an end ring of the housing component. The shoulder is inserted into the collar for assembly purposes. For this purpose, the collar advantageously has an inner diameter which is slightly larger than the outer diameter of the shoulder, thereby permitting easy assembly.

The shoulder of the housing component particularly preferably has a number of indentations along its outer circumference via which the housing flange is caulked to the housing component. This prevents the flange and the housing component from twisting in relation to each other and the components from being axially offset.

In principle, a caulking process permits all flexibly deformable materials to be connected to each other, which even makes it possible to join different materials. As a result, the material properties of the components may be combined according to the use requirements. The form-lock between the housing flange and the housing component created during caulking permits these parts to be securely fastened to each other. The plastic deformation of at least one of the components causes the component to be non-detachably interlocked. In a valve housing having a plastic housing component and a metallic housing flange, a secure connection of the two components may be implemented while minimizing the weight of the valve housing.

The indentations make it possible to accommodate material of the housing flange. Due to the caulking, the material enters the indentations in the housing component and thus forms the desired form-locked connection. The indentations may have, in principle, different designs for this purpose, for example they may be designed as pockets or grooves. They extend radially into the material of the shoulder and may be produced as a single piece therewith during manufacture of the housing component, for example in an injection molding process. Furthermore, the indentations are preferably distributed evenly over the outer circumference of the housing component to ensure a uniform attachment.

The indentation or every indentation is preferably designed as an edge recess on the edge of the shoulder facing axially away from the collar. Providing the edge recess in this location on the outer circumference offers the advantage that a sufficient wall thickness remains on the edge of the shoulder axially facing the collar. In this way, the forces acting upon the valve housing during operation of a camshaft adjuster, or the high load peaks arising during activation of a control piston, may be withstood without the material of the shoulder breaking off.

To axially secure the housing component on the housing flange, a nub extending radially toward the outside may be additionally produced in the indentation or in each indentation. In the caulked state, the nub is enclosed by the material of the housing flange and thus prevents an axial offset during operational loads, i.e., it prevents an axial shift of the components in relation to each other. The axial attachment may be achieved, in particular, by selectively crimping the nubs when the housing component is mounted on the housing flange. The size of the nub is adapted, in particular, to the design of the indentation. In principle, it is also conceivable to situate multiple nubs within one indentation, these numbers being used to axially attach the housing component to the housing flange. Alternatively or additionally, for example, elements having different shapes may also be provided for axial securing.

The housing component preferably includes a number of annular elements which are spaced an axial distance apart and are connected to each other by axial webs. Both the axial webs and the spaced-apart annular elements preferably run in parallel to each other, resulting in a stable lattice. The lattice openings may be used to introduce filter elements. The number of axial struts and rings may vary as a function of the requirements imposed on the housing component, for example with regard to the size of the valve housing.

In another advantageous embodiment of the present invention, at least one collar part of the housing flange is crimped around the shoulder of the housing component and rests against the axial webs for rotatably fixed attachment to the axial webs. The collar extends in the axial direction in such a way that it is able to accommodate the shoulder of the housing component. The collar parts provided on the collar are designed, for example, in the form of tabs which extend in the axial direction. They are advantageously provided on the collar in such a way that they are placed around the shoulder on the plastic part by crimping during assembly and make contact on both sides between the axial webs. By crimping the collar parts and the resulting lateral contact with the axial webs, the housing component and the housing flange may achieve a rotatably fixed attachment as well as an axial securing of the components.

To position the housing component uniformly on the housing flange, the collar is preferably provided with a plurality of axially extending collar parts which are provided over its circumference at a uniform distance from each other. The number of collar parts is preferably adapted to the number of axial webs, so that one collar part may be crimped between two axial webs converging on the shoulder of the housing component.

It is furthermore preferred to design the annular element on the axial end of the housing component as a shoulder, the axial webs converging on the shoulder, each forming an axial contact surface for the collar of the housing flange. In the assembled state, this embodiment permits an axial securing of the components to each other in both directions, in particular in combination with the edge recesses in the outer circumference of the shoulder of the housing component.

The second object of the present invention is achieved according to the present invention by a method for manufacturing a valve housing for a control valve, a housing flange being produced for attachment to a control unit, an essentially cylindrical housing component being produced for accommodating a control piston, and the housing component being rotatably fixedly attached to the housing flange by a form-locked connection.

This method provides a cost-effective and easily handled way to manufacture a valve housing which is suitable, in particular, for use in a control valve, due to its light weight. The rotatably fixed connection of the components to each other is achieved by a form-lock.

In another advantageous embodiment of the present invention, the valve housing is manufactured in such a way that the housing flange is produced with a collar, along whose outer circumference a number of indentations are provided, each having a nub which extends radially to the outside, and the shoulder of the housing component is inserted into the housing flange, a material of the collar being caulked into the indentations in the shoulder.

The shoulder of the housing component is caulked to the collar of the housing flange in such a way that the material of the collar enters the indentations in the housing component. Due to the form-locked connection thus provided, the housing component may be fixed axially to the housing flange in addition to being rotatably fixedly attached thereto. In other words, the form-lock simultaneously prevents the components from twisting in relation to each other and also permits an axial fixing of the housing flange to the housing component.

Due to the caulking, it is possible to produce the housing component and the housing flange from different materials. Accordingly, the particular area of the resulting valve housing may be specifically adapted to the intended use. A valve housing manufactured in this way may therefore be manufactured cost-effectively and in a customer-specific manner. The housing component is preferably made of a plastic in an injection molding process, together with the indentations and the nubs in a mold provided for this purpose, while the housing flange is designed, for example, as a turned part.

The use of an appropriate caulking tool is suitable for caulking. For this purpose, for example, the housing flange may be clamped into a holder, and the housing component may be inserted with its shoulder into the collar of the housing flange. The caulking tool is then positioned around the circumference of the components which have been inserted into each other in such a way that the caulking tool is placed on the circumference of the collar of the housing flange at the particular places to be caulked. This tool is preferably a tool which may be used to carry out a so-called segmented caulking process. The caulking tool or its caulking components are placed only at the points on the circumference where the indentations for accommodating material are provided in the shoulder of the housing flange.

By applying pressure to the collar of the housing flange, the material of the collar is pressed into the indentations in the housing component at the intended points. The material enters the indentations, where it encloses the nubs provided within the indentations. The form-lock established in this manner ensures the necessary axial and radial securing of the components to each other and thus increases the operational reliability of a camshaft adjuster.

Overall, the functional requirements to be met by the valve housing may be implemented cost-effectively by integrating indentations and nubs in combination with the segmented caulking process used to connect the components.

During manufacture of the valve housing, a sleeve may also be introduced, which is pressed with the housing flange before the shoulder of the housing component is inserted into the collar of the housing flange. The housing component is then pushed onto the sleeve after pressing and caulked to the housing flange. The sleeve is preferably made of a steel and has a lattice structure and may be provided with a filter element, for example alternatively or additionally to the housing component.

In another advantageous embodiment of the present invention, the valve housing is manufactured in such a way that the housing flange is produced with a collar, the housing component is produced with a shoulder and a number of axial webs converging on the shoulder, the shoulder of the housing component is inserted into the collar of the housing flange, at least one collar part being crimped around the shoulder in such a way that the shoulder rests against the axial webs for rotatably fixed attachment.

The components may be axially secured to each other by crimping one or multiple collar parts around the shoulder of the housing component. The collar parts are crimped between the axial webs after the shoulder is inserted, so that they make contact with the shoulder on both sides. In this way, the necessary axial attachment of the components to each other is achieved, and they are also rotatably fixedly attached to each other.

The advantages mentioned above for the valve housing may be transferred analogously to both methods.

BRIEF DESCRIPTION OF THE DRAWINGS

Exemplary embodiments of the present invention are explained in greater detail below with reference to one drawing.

DETAILED DESCRIPTION

Figure 1:
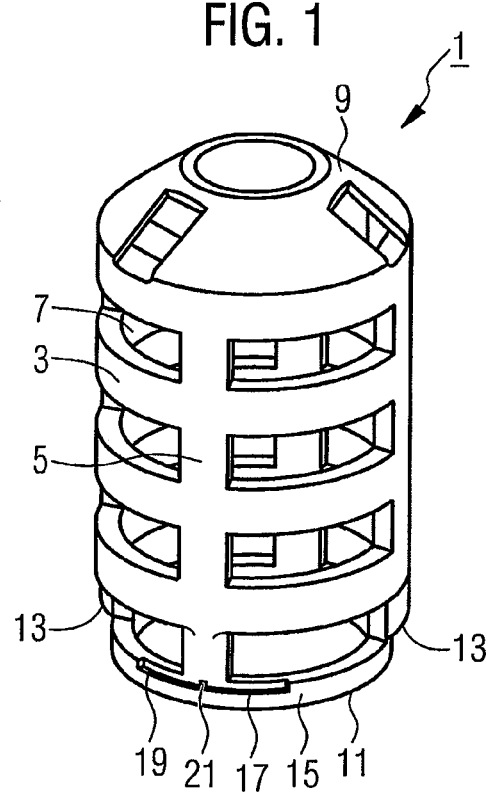
FIG. 1 shows a housing component for a valve housing in a three-dimensional representation.

FIG. 1 shows a housing component 1 for a valve housing in a three-dimensional representation. Housing component 1 has an essentially cylindrical design and is made of a plastic in an injection molding process. Housing component 1 is used to accommodate an electrically controlled control piston in the installed state. Hydraulic fluid may be metered by this axially movable control piston for operating a camshaft adjuster.

Housing component 1 includes five annular elements 3, which are spaced an axial distance apart and are connected to each other by four axial webs 5. Axial webs 5 run in parallel to each other, thereby producing a lattice. Filter elements for filtering the hydraulic fluid may be introduced into lattice openings 7.

On its axial ends, housing component 1 is provided with an annular element 3, which has a cross section which tapers in the axial direction. This annular element 3 is used as a stop 9 for a control piston which is axially movably mounted in housing component 1 during operation of a camshaft adjuster.

Figure 3:
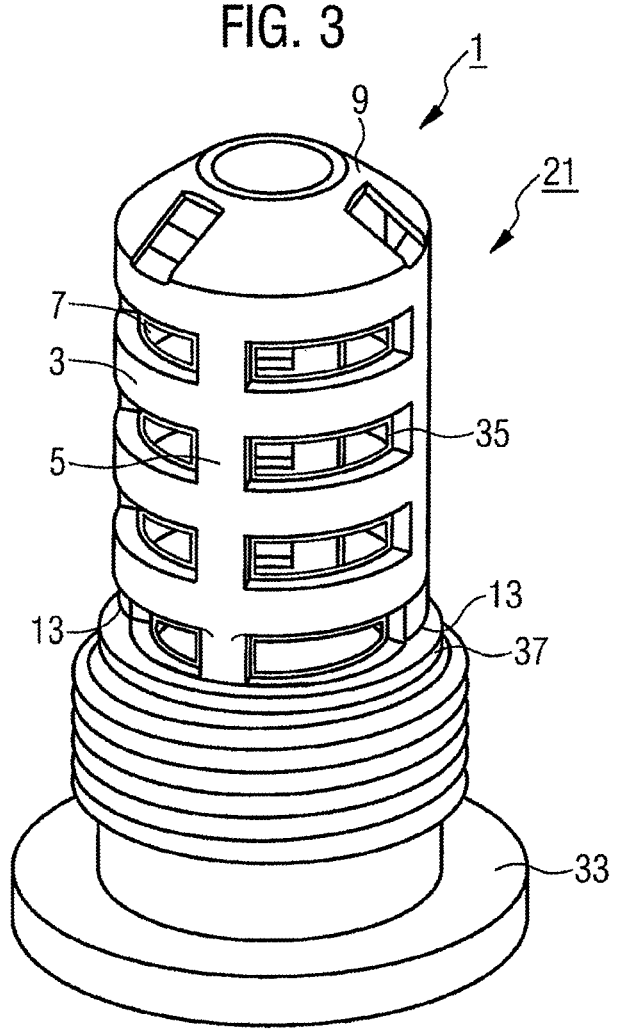
FIG. 3 shows a valve housing for a control valve, including a housing component according to FIGS. 1 and 2, in a three-dimensional representation.

On the other end, which terminates housing component 1, annular element 3 is designed as a shoulder 11. The outer diameter of shoulder 11 is smaller than the outer diameter of remaining annular element 3, whereby an axial contact surface 13 for the collar of a housing flange is produced on each axial web 5 connected to shoulder 11 in the assembled state of a valve housing. FIG. 3 shows a valve housing in an assembled representation.

Shoulder 11 has three indentations 17 along its outer circumference 15, which are introduced an equal distance apart. Indentations 17 are designed as edge recesses on edge 19 of shoulder 11 facing away in the axial direction and are used for rotatably fixed attachment to a housing flange. A nub 21, which extends radially to the outside, is additionally provided in each edge recess 17 to axially secure the housing component to a housing flange.

Due to indentations 17 and nubs 21, the form-locked connection of housing component 1 to a housing flange may be established in the assembled state, which, in addition to preventing twisting, also permits the axial fixing of the components to each other.

Figure 2:
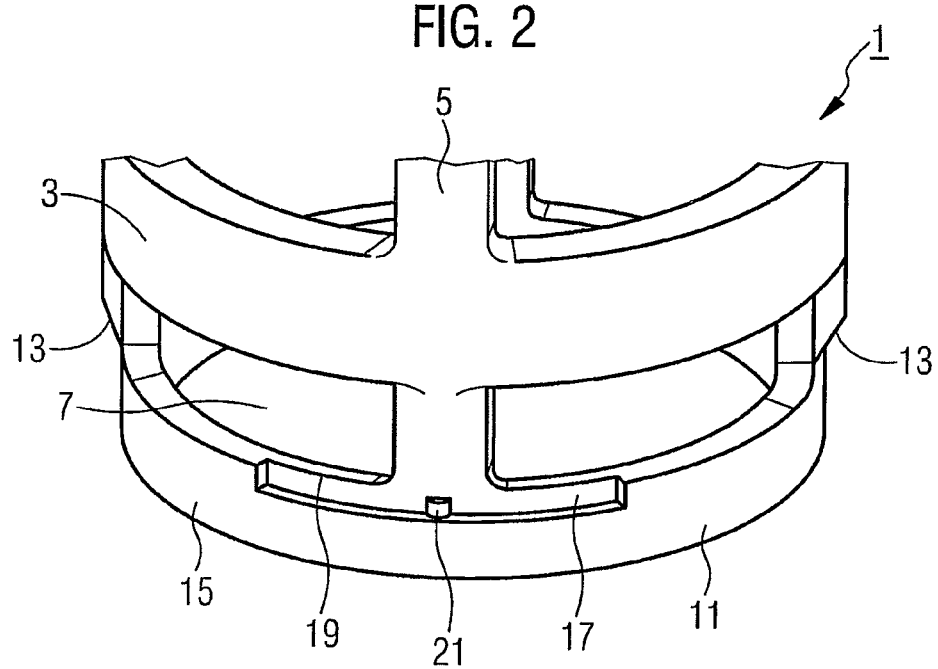
FIG. 2 shows a detailed view of the housing component according to FIG. 1.

For clarification, FIG. 2 shows a detailed view of housing component 1 according to FIG. 1. This figure clearly shows indentations 17 and nubs 21. During connection to a housing flange, material of the housing flange may be accommodated in indentations 17, so that a form-locked connection is formed between the housing flange and housing component 1. This form-locked connection may transmit particularly high forces and offers a great deal of security against an undesirable detachment of the components from each other.

Due to the design of indentations 17 as edge recesses, a sufficient wall thickness remains on the edge of shoulder 11 facing the collar in the axial direction, a wall thickness which withstands the high load peaks arising when a control piston is activated during operation.

In the caulked state, nub 21 is enclosed by the material of the housing flange and thus prevents an axial offset during operational loads, i.e., it prevents axial shifting of the components in relation to each other. The axial fastening may be achieved, in particular, by selectively crimping nubs 21 when housing component 1 is mounted on the housing flange.

FIG. 2 clearly shows axial contact surface 13 for the collar of a housing flange. The collar of a housing flange may be axially secured on axial contact surface 13. In combination with edge recesses 17 in outer circumference 15 of shoulder 11, an axial securing may be achieved in both directions in the assembled state.

FIG. 3 shows a valve housing 31 for a control valve in a three dimensional representation in the assembled state. The valve housing includes a housing component 1 according to FIGS. 1 and 2, a housing flange 33 as well as a sleeve 35. Housing component 1 is described in detail in FIGS. 1 and 2, so that reference is hereby made to these figures at this point.

Housing flange 33, which is produced from a metallic material, has a collar 37, into which housing component 1, along with its shoulder 11, is inserted. The inner diameter of collar 37 is slightly enlarged in relation to the outer diameter of shoulder 11 of housing component 1, so that shoulder 11 is easily insertable into collar 37. During insertion of housing component 1, collar 37 makes contact with axial contact surfaces 13, which are not visible in FIG. 3, where it is secured against a shift in the axial direction. In combination with indentations 17 designed as edge recesses in outer circumference 15 of shoulder 11 an axial securing may be achieved in both directions in the assembled state.

Housing flange 33 is caulked to housing component 1, forming a form-locked connection, via indentations 17, which are provided along outer circumference 15 of shoulder 11 of housing component 1.

This is achieved using a caulking tool. To assemble the two components, housing component 1, together with its shoulder 11, is inserted into collar 37 of housing flange 33. The caulking tool then caulks shoulder 11 and collar 37 at each of the points at which indentations 17 are provided with nubs 21 on outer circumference 15 of shoulder 11. Due to the pressure of the caulking tool, the material of collar 37 is pressed into indentations 17 in shoulder 11. The material entering indentations 17 then also encloses nubs 21 provided therein. The axial attachment of the components to each other is achieved by selectively crimping nubs 21.

The form-lock between collar 37 and shoulder 11 produced during this process permits an axial fixing of housing component 1 to housing flange 33, in addition to the rotatably fixed attachment.

In the present case, sleeve 35 is pressed to housing flange 33 before housing component 1 and housing flange 33 are caulked. The housing component is pushed onto sleeve 35 only after pressing, and the caulking process described above is finally carried out. Like housing component 1, sleeve 35 is also designed in the form of a lattice made of steel. Filter elements for filtering hydraulic fluid may be introduced into the lattice openings, which are not illustrated in the present case. In the assembled state, the lattice openings in sleeve 35 and lattice openings 7 in housing component 1 are located above each other, so that the openings needed for metering hydraulic fluid are sufficiently large.

Figure 4:
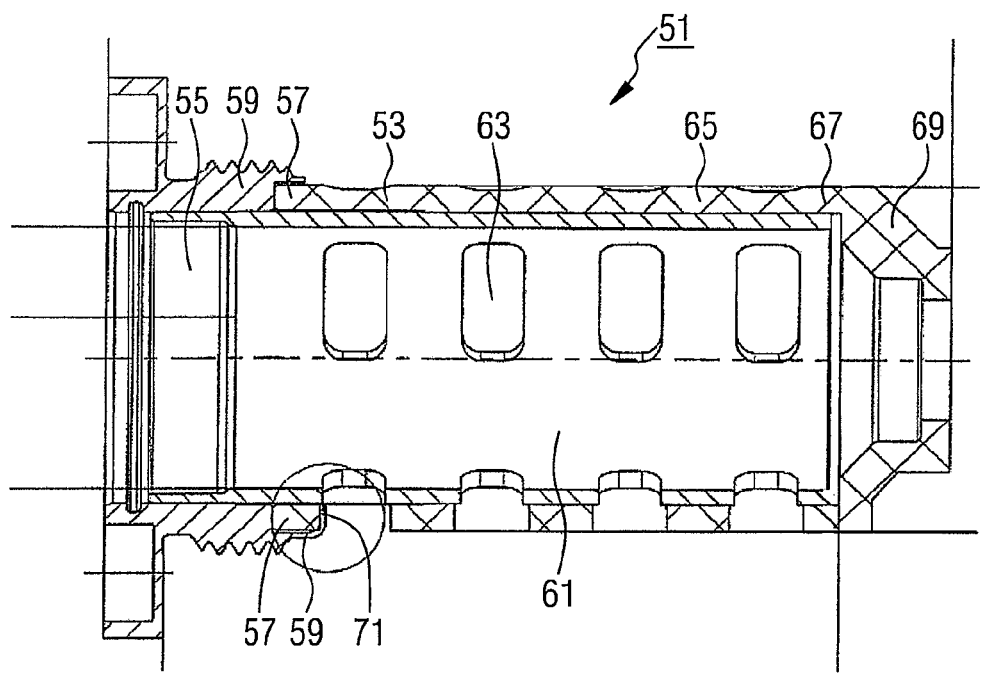
FIG. 4 shows another valve housing for a control valve in a longitudinal section.

FIG. 4 shows a valve housing 51 for a control valve having a housing component in a longitudinal section. Like valve housing 31 from FIG. 3, valve housing 51 includes a housing component 53 and a housing flange 55, which are connected to each other in a form-locked manner. For this purpose, shoulder 57 of housing component 53 is inserted into collar 59 of housing flange 55.

Valve housing 51 furthermore has a sleeve 61, which is pressed into collar 59 of housing flange 55 before housing component 53 is mounted. Sleeve 61 is made of a steel and has lattice openings 63, through which hydraulic fluid may be metered during operation for the purpose of adjusting a camshaft adjuster.

Housing component 53 includes five annular elements 65 and three axial webs 67 connected thereto. Final annular element 65 on one axial end of housing component 53 is designed as shoulder 57, which is accommodated in collar 59 of housing flange 55. In the present case, shoulder 57 has the same outer diameter as remaining annular elements 65.

Annular element 65 provided on the other axial end of housing component 53 is provided with a cross section which tapers in the axial direction and which is used as a stop 69 for a control piston (not illustrated) guided axially within sleeve 61.

The form-locked connection between housing component 53 and housing flange 55 in FIG. 4 is established by the design of collar 59. After shoulder 57 of housing component 53 is inserted into housing flange 55, collar 59 of housing flange 55 encloses shoulder 57. To attach shoulder 57, collar 59 has three collar parts 71, which are provided, spaced equidistantly apart, on its circumference. Of collar parts 71, only one collar part 71 is shown according to the representation.

Collar parts 71 are designed as tabs and, in the uninstalled state, extend in the axial direction between axial webs 67 of housing component 53 converging on shoulder 57. For attachment, collar parts 71 and their shoulder 57 are crimped so that they enclose shoulder 57 in the areas between axial webs 67. Due to the crimping of collar parts 71 and the lateral contact on axial webs 67, a rotatably fixed attachment as well as an axial securing of the components may be achieved. In this way, sufficient security may be ensured during operation of a camshaft adjuster, in particular under high loads.

Figure 5:
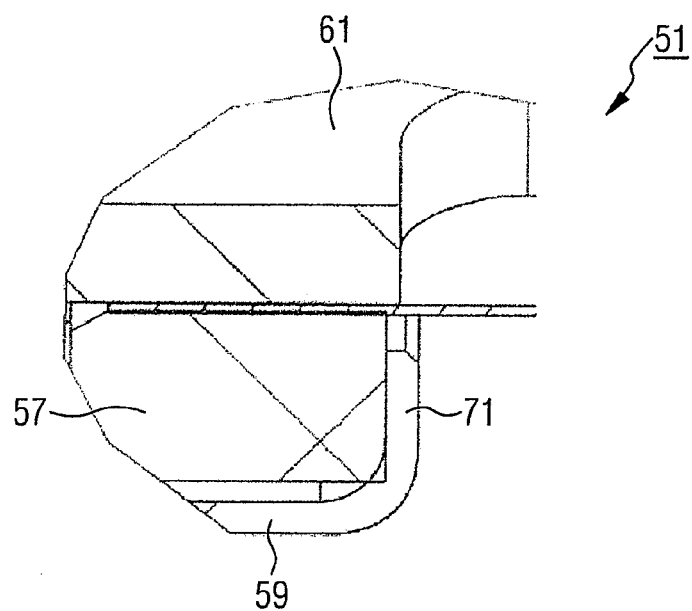
FIG. 5 shows a detailed view of the valve housing according to FIG. 4.

FIG. 5 shows a detailed view of valve housing 51 according to FIG. 4. This figure clearly shows one of the three collar parts 71, which is crimped around shoulder 57 of housing component 53. An axial shift of the components in relation to each other is not possible, and housing component 53 and housing flange 55 are non-rotatably attached to each other, due to the lateral contact of crimped collar parts 71 on axial webs 67.

Figure 6:
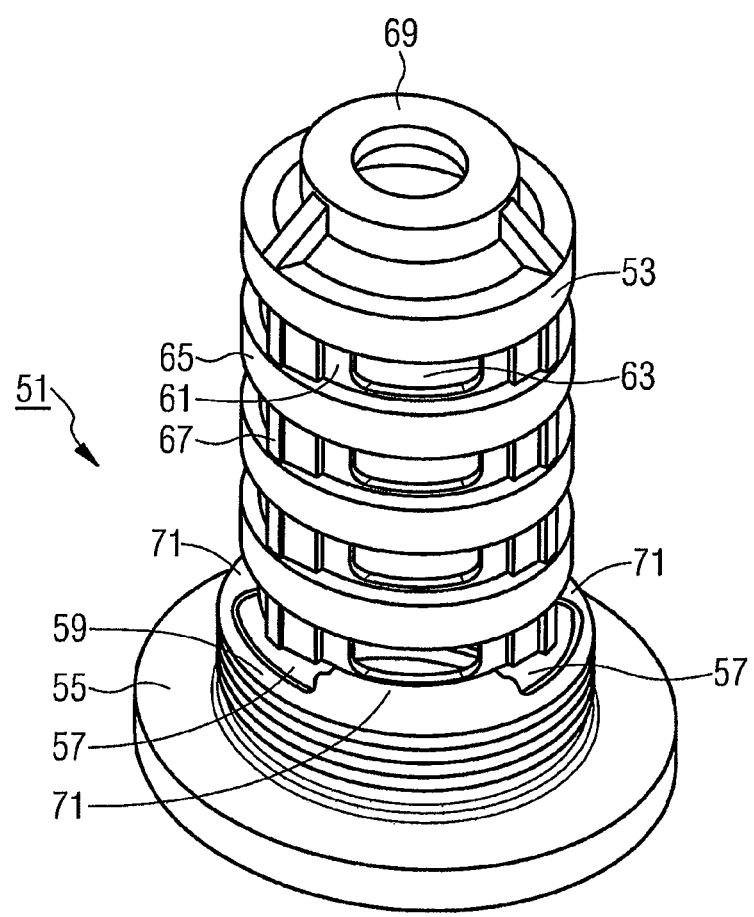
FIG. 6 shows the valve housing according to FIGS. 4 and 5 in a three-dimensional representation.

FIG. 6 shows valve housing 51 according to FIGS. 4 and 5 in a three-dimensional representation. Valve housing 51 is described in detail in FIGS. 4 and 5, so that reference is made to these figures at this point.

The form-lock between housing component 53 and housing flange 55 due to the design of collar 59 is clearly visible in FIG. 6. Collar 59 has three collar parts 71, each of which is crimped between axial webs 67. In the assembled state, collar parts 71 are placed around shoulder 57 of housing component 53 in such a way that axial webs 67 of housing component 53 come to a stop against surrounding collar parts 71 as soon as the components are twisted in relation to each other.

Overall, the form-lock between collar parts 71 of housing flange 55 and shoulder 57 of housing component 53 established during crimping prevents the components from twisting in relation to each other and additionally provides the axial securing thereof.

LIST OF REFERENCE NUMERALS

1 Housing component
3 Annular element
5 Axial webs
7 Lattice openings
9 Stop
11 Shoulder
13 Axial contact surface
15 Outer circumference
17 Indentations
19 Edge
21 Nubs
31 Valve housing
33 Housing flange
35 Sleeve
37 Collar
51 Valve housing
53 Housing component
55 Housing flange
57 Shoulder
59 Collar
61 Sleeve
63 Lattice openings
65 Annular element
67 Axial webs
69 Stop
71 Collar parts

What is claimed is:

1. A valve housing for a control valve of a camshaft adjusting system comprising:
 a housing flange for fastening to a control unit; and
 a cylindrical housing component for accommodating a control piston, the housing component being rotatably fixedly attached to the housing flange by a form-locked connection, wherein the housing flange includes a collar into which the housing component is inserted with a shoulder and wherein the shoulder of the housing component has a plurality of indentations along its outer circumference, via which the housing flange is caulked to the housing component.

2. The valve housing as recited in claim 1 wherein the housing component is additionally axially fixed to the housing flange by the form-locked connection.

3. The valve housing as recited in claim 1 wherein at least one of the indentations includes an edge recess on an edge of the shoulder facing away from the collar.

4. A valve housing for a control valve of a camshaft adjusting system comprising:
 a housing flange for fastening to a control unit; and
 a cylindrical housing component for accommodating a control piston, the housing component being rotatably fixedly attached to the housing flange by a form-locked connection, wherein the housing component includes a plurality of annular elements spaced an axial distance apart and connected to each other by axial webs.

5. The valve housing as recited in claim 4 wherein at least one collar part of the housing flange is crimped around a shoulder of the housing component and rests against the axial webs for rotatably fixed attachment.

6. The valve housing as recited in claim 4 wherein at least one of the annular elements is provided at one axial end of the housing component as a shoulder, the axial webs converging on the shoulder, each forming an axial contact surface for a collar of the housing flange.

7. A method for manufacturing a valve housing for a control valve, the method comprising:
 producing a housing flange for fastening to a control unit;
 producing a cylindrical housing component for accommodating a control piston; and
 rotatably fixing the housing component to the housing flange by a form-locked connection, wherein
 the housing flange is produced with a collar, the housing component is produced with a shoulder along whose outer circumference a plurality of indentations are provided, and the shoulder of the housing component is inserted into the collar of the housing flange, and a material of the collar is caulked into the indentations in the shoulder.

* * * * *